S. B. LUST.
ELECTRIC CIRCUIT CLOSER FOR AUTOMOBILES.
APPLICATION FILED OCT. 9, 1918.
1,303,086.
Patented May 6, 1919.
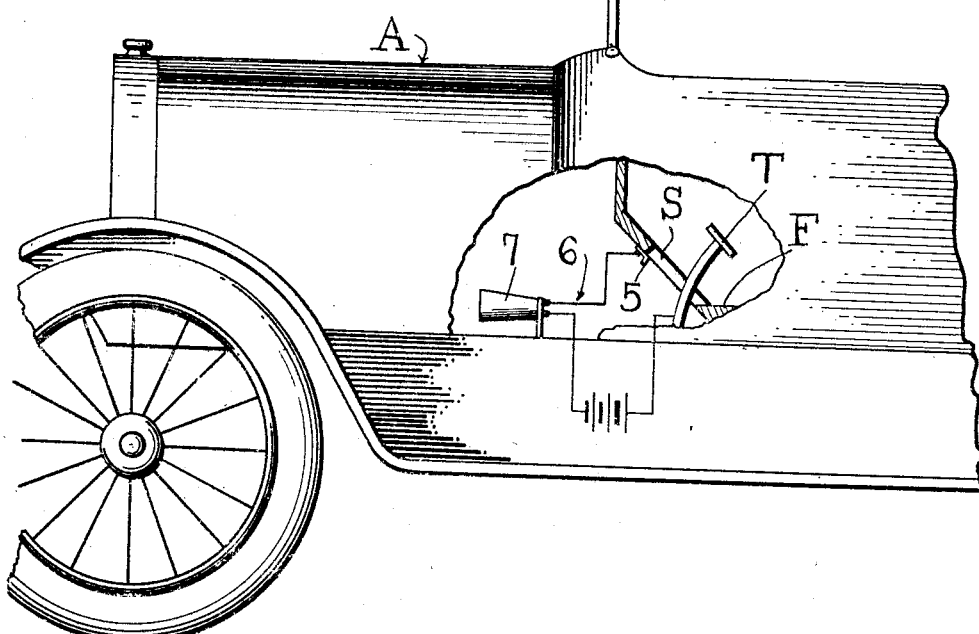
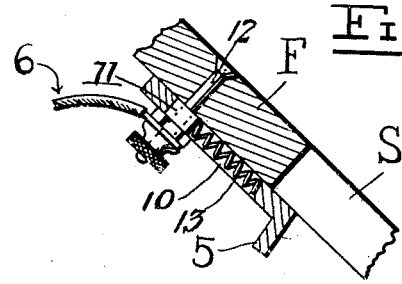
Sidney B. Lust, Inventor

UNITED STATES PATENT OFFICE.

SIDNEY B. LUST, OF WASHINGTON, DISTRICT OF COLUMBIA.

ELECTRIC-CIRCUIT CLOSER FOR AUTOMOBILES.

1,303,086.    Specification of Letters Patent.    Patented May 6, 1919.

Application filed October 9, 1918. Serial No. 257,497.

*To all whom it may concern:*

Be it known that I, SIDNEY B. LUST, a citizen of the United States, residing at Washington, in the District of Columbia, have invented certain new and useful Improvements in Electric-Circuit Closers for Automobiles, of which the following is a specification.

This invention relates to automobiles and more particularly to an electric circuit closer for the horn thereof.

The primary object of this invention resides in the provision of means whereby electric horns on automobiles are caused to sound as the treadle is manipulated to apply the brakes.

With this and other objects in view my invention resides in certain novel features of construction and arrangement of elements to be more particularly set forth in the specification herewith and pointed out in the appended claim, it being understood that the right is reserved to resort to such changes in construction as come within the scope of the claim.

In the accompanying drawing:—

Figure 1 is a side view of an automobile showing a portion of the near side thereof broken away with the horn and its contact element shown in position for operation, the battery being illustrated in a conventional manner;

Fig. 2 is an enlarged sectional view through the yieldable contact element.

In the present embodiment of this invention, the letter A designates a portion of an automobile and T indicates the brake treadle thereof which projects through the usual slot S in the floor F of the automobile.

Slidably secured at the forward end of the slot S is a yieldable and slidable contact element 5 which forms one terminal of an electric circuit 6 and is adapted to be engaged by the brake treadle, which forms another terminal, of the automobile to cause the circuit to close and the horn 7 to sound as the brakes are applied to stop the automobile.

The member 5 is provided with a longitudinally disposed slot 10 which receives a nut 11 mounted on a bolt 12 which in turn passes through the floor F. A spring 13 is located in the slot 10 and is interposed between the end wall of the slot and the side of the nut. Thus the member 5 is restrained against turning movement and is held with one end between the ends of the slot S and in the path of movement of the treadle T.

With this invention fully set forth it is manifest that means are provided for simultaneously sounding the horn on an automobile and applying the brakes thereof and in view of the simplicity of their construction they can be manufactured at small expense and sold very reasonable.

Having thus described my invention what I claim is:—

A circuit closer comprising a support having a slot, a treadle movably mounted and passing through the slot, an element movably mounted on the support and having a slot, a bolt passing through the support and slot of the element, a nut mounted on the bolt and located in the slot of the element and adapted to restrain the element against turning movement, a spring located in the slot of the element and interposed between the bolt and the end wall of the slot of the element and adapted to normally hold an end portion of the element at a point between the ends of the slot in the support and an electric circuit having its terminals connected with the treadle and bolt respectively.

In testimony whereof I affix my signature.

SIDNEY B. LUST.

Copies of this patent may be obtained for five cents each, by addressing the "Commissioner of Patents. Washington, D. C."